(12) United States Patent
Gardner, Jr. et al.

(10) Patent No.: US 7,071,829 B2
(45) Date of Patent: Jul. 4, 2006

(54) LIGHT EXTINCTION BASED NON-DESTRUCTIVE FLYING INSECT DETECTOR

(75) Inventors: James P. Gardner, Jr., Stillwater, MN (US); David N. Demattia, Lindstrom, MN (US)

(73) Assignee: Ecolab Inc., St. Paul, MN (US)

( * ) Notice: Subject to any disclaimer, the term of this patent is extended or adjusted under 35 U.S.C. 154(b) by 169 days.

(21) Appl. No.: 10/401,302

(22) Filed: Mar. 26, 2003

(65) Prior Publication Data

US 2003/0218543 A1 Nov. 27, 2003

Related U.S. Application Data

(60) Provisional application No. 60/428,480, filed on Nov. 22, 2002, provisional application No. 60/368,647, filed on Mar. 29, 2002.

(51) Int. Cl.
  *G08B 23/00* (2006.01)
(52) U.S. Cl. ............. 340/573.2; 43/107; 250/221; 340/556
(58) Field of Classification Search ........... 340/573.2, 340/555–557; 43/107, 112, 114, 132.1; 250/221
  See application file for complete search history.

(56) References Cited

U.S. PATENT DOCUMENTS

| | | | |
|---|---|---|---|
| 2,637,931 A | 5/1953 | Sklar | |
| 3,843,924 A | 10/1974 | Wahlgren | |
| 3,992,803 A | 11/1976 | Kaiser | |
| 4,030,230 A | 6/1977 | Souza | |
| 4,040,046 A | 8/1977 | Long et al. | |
| 4,517,557 A | 5/1985 | Agron et al. | |
| 4,525,699 A | 6/1985 | Buck et al. | |
| 4,794,549 A | * 12/1988 | Van Albert et al. | 340/573.1 |

(Continued)

FOREIGN PATENT DOCUMENTS

EP 0 283 142 A1 9/1988

(Continued)

*Primary Examiner*—Thomas Mullen
(74) *Attorney, Agent, or Firm*—Merchant & Gould P.C.

(57) ABSTRACT

A non-destructive flying insect detector is disclosed. The detector creates a sheet or curtain of light comprising a sensing zone and detects, by means of light extinction, individual flying insects that intersect the sensing zone. The sensing zone is created by a beam of light that enters the sensing zone area and is then bounced between opposing reflective surfaces. Preferably a laser is utilized to generate the beam of light. The beam of light leaves the sensing zone area and is incident on a light detection device (such as a photo cell) connected to an amplifier circuit. The light detection device monitors the light intensity and is arranged and configured to detect changes in the light intensity. The changes are electronically converted to a pest detection signal and/or to a flying insect count. Each flying pest detection signal may also be associated with other monitored data. For example, the time and date when the count occurred, the temperature, and the ambient light, among other parameters may be stored with the flying insect count(s). The stored data may be transmitted in real time, transmitted periodically, and/or collected with a PDA device or the like. The detector may be completely passive or it may provide an attractant for the flying insects—such as UV lamps. Further, the detector can act as a counter alone (e.g., as a flying insect monitor without a physical trap) or it can operate together with a trap. In the latter case, the flying insect may become entangled on a glue or sticky board lying beneath the light curtain and/or become eliminated by an electrical discharge device.

37 Claims, 4 Drawing Sheets

U.S. PATENT DOCUMENTS

| | | | |
|---|---|---|---|
| 4,862,145 A * | 8/1989 | Meehan et al. | 340/573.2 |
| 4,884,064 A | 11/1989 | Meehan | |
| 5,005,416 A | 4/1991 | Vick et al. | |
| 5,040,326 A | 8/1991 | Van Dijnsen et al. | |
| 5,365,690 A | 11/1994 | Nelson et al. | |
| 5,392,732 A | 2/1995 | Fry | |
| 5,646,404 A * | 7/1997 | Litzkow et al. | 250/338.1 |
| 5,815,090 A | 9/1998 | Su | |
| 6,052,066 A | 4/2000 | Su | |
| 6,313,643 B1 | 11/2001 | Tirkel et al. | |
| 6,445,301 B1 | 9/2002 | Farrell et al. | |
| 6,661,340 B1 | 12/2003 | Saylor et al. | 340/541 |
| 6,707,384 B1 | 3/2004 | Shuman et al. | |
| 6,720,874 B1 | 4/2004 | Fufido et al. | 340/541 |
| 6,775,946 B1 * | 8/2004 | Wright | 43/61 |
| 6,778,085 B1 | 8/2004 | Faulkner et al. | 340/541 |
| 6,792,395 B1 | 9/2004 | Roberts | |
| 6,914,529 B1 | 7/2005 | Barber et al. | 43/124 |
| 6,922,940 B1 | 8/2005 | Rollins | 43/124 |
| 6,970,081 B1 | 11/2005 | Cheng | 340/541 |
| 2001/0054962 A1 | 12/2001 | Barber et al. | |
| 2003/0160699 A1 | 8/2003 | Trompen | |
| 2003/0210139 A1 | 11/2003 | Brooks et al. | 340/541 |
| 2004/0020100 A1 | 2/2004 | O'Brien et al. | |
| 2004/0086089 A1 | 5/2004 | Naidoo et al. | 340/541 |

FOREIGN PATENT DOCUMENTS

| | | |
|---|---|---|
| EP | 395135 A1 | 4/1990 |
| JP | 4-166033 B1 | 6/1992 |
| JP | 6-22671 B1 | 2/1994 |
| JP | 9-65812 B1 | 3/1997 |
| JP | 09094048 | 4/1997 |
| JP | 10-84834 B1 | 4/1998 |
| JP | 10099001 A * | 4/1998 |
| JP | 2000060403 A * | 2/2000 |
| JP | 2004-57147 B1 | 2/2004 |
| JP | 2004-129594 B1 | 4/2004 |
| WO | WO-2002/21912 A2 | 3/2002 |
| WO | WO-2002/26033 A1 | 4/2002 |
| WO | WO-2004/030450 A2 | 4/2004 |

* cited by examiner

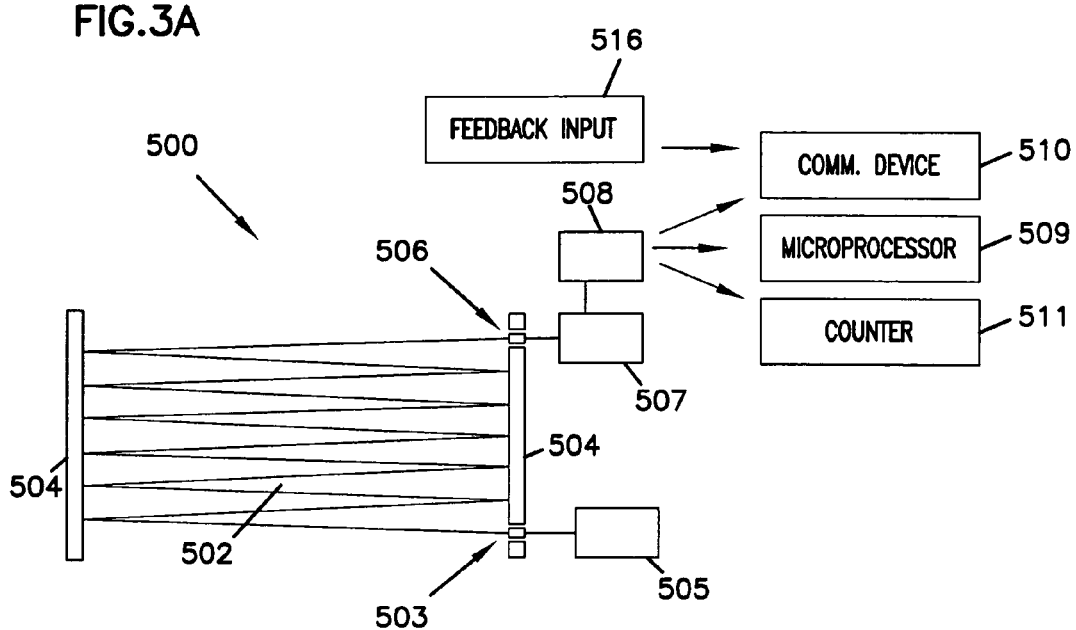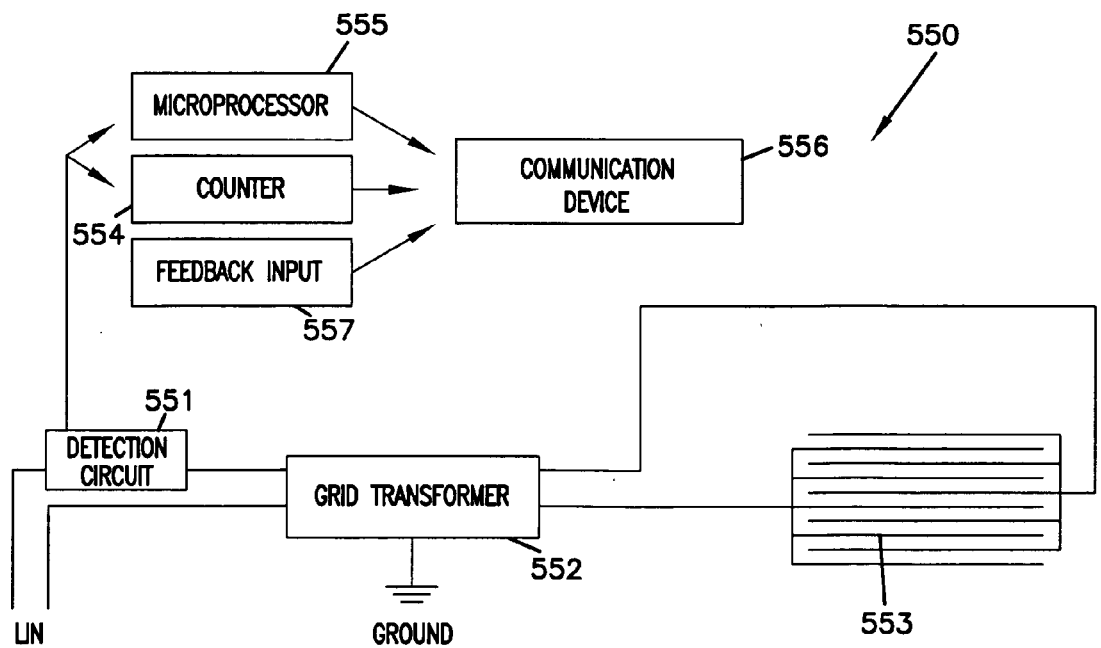

LIGHT EXTINCTION BASED NON-DESTRUCTIVE FLYING INSECT DETECTOR

This application claims priority from provisional application Serial No. 60/428,480, filed Nov. 22, 2002 and provisional application Serial No. 60/368,647, filed Mar. 29, 2002, and which are incorporated herein by reference.

FIELD OF THE INVENTION

This invention relates generally to the detection of insects; and more particularly to a method and apparatus for the detection of flying insects that intersect a sheet of light.

BACKGROUND

Rodents, flies, cockroaches, and other nuisance insects and animals (hereafter referred to collectively as "pests") create health concerns and introduce spoilage, among other concerns. Many businesses deploy a variety of traps and/or monitors throughout the business' physical premises and facilities to insure a reduction and/or elimination of such pests. These actions can be undertaken to insure inspection compliance, to maintain sanitary conditions, reduce spoilage, comply with applicable laws and regulations, and/or increase consumer confidence. Even upon complete elimination of pests from a physical site, however, the pests can often find their way back into the premises. For example, open doors, windows or loading docks, cracks in foundations, delivery of contaminated materials or packaging, etc., may all provide an avenue for access back into the premises. Therefore, even if the pests are reduced or eliminated, pest traps are continuously used in order to detect the presence of pest activity.

More specifically with regard to flying insects, there is a need in the art to detect the presence of these pests. Spreading large amounts of pesticides over broad areas to control flying insects without regard to whether there are actually insects in the area is undesirable. To reduce the risk of inadvertent human contact with the pesticides, a more directed application limited to those areas where the insects are detected is preferable. Also, if traps are used in addition to the pesticides (or in lieu of pesticides), there is a time cost associated with checking each trap. Depending on the facility in which the insect control takes place, the presence of a large number of traps can also be unsightly or inappropriate. Therefore, detecting the number and location of the insects, as well as determining the true source of the pest activity (e.g., open doors, etc.), is advantageous since a targeted pesticide application and/or trapping strategy can be developed.

Prior methods of detecting pests include utilizing a single beam of light that is incident on a detector. This type of application is typically found in environments where a limited point of access is available—such as in a beehive entrance. However, due to the limited entrance zone in which pests will trip the light beam, this type of system has significant drawbacks and will not work when an area needs to be monitored. Another system employed in the prior art to detect pests is thermal detection. One example is the IR detection system disclosed in U.S. Pat. No. 6,445,301 issued to Farrell et al. However, flying insects are not generally sensed by such thermal systems. Accordingly, each of the prior art systems has drawbacks in detecting flying insects.

The current flytraps used in pest control service employ several methods of immobilizing flying insects. A service technician during routine service cleans the trap and may make a note of the extent of activity at the trap based on visual inspection. This standard method of pest control service has a number of limitations. Of primary importance to customers and pest control companies is verifying that technicians actually visited the trap and did not simply conjure up false information. A second limitation is that activity (i.e., a count of insects) is only trackable to the time between services, such as monthly or weekly. Since the data is not real-time activity, it cannot be broken down into daily or hourly counts. This limitation prevents the implementation of proactive solution of problems (e.g., such as employees leaving doors open) and the targeted response to known problems (e.g., such as discarding potentially contaminated products based on pest activity). Therefore, there is a need in the art to provide both real-time data logging and communication of additional trap parameters (e.g., service activity).

Therefore, there is a need in the art for a flying insect detecting system. Such a system would preferably be arranged and configured to be used as either a passive detector and/or as a part of a combined sensor and trap. The device should also provide both real-time data logging and communication of additional trap parameters (e.g., service activity). The present invention overcomes the shortcomings of the prior art and addresses these needs in the art.

SUMMARY

A preferred embodiment of an apparatus constructed according to the principles of the present invention includes a flying insect detector. The detector includes means for creating a sheet or curtain of light comprising a sensing zone and means for detecting, by means of light extinction, individual flying insects that intersect the sensing zone. The sensing zone is created by a beam of light which enters the sensing zone area and is then bounced between opposing reflective surfaces. In the preferred embodiment, a laser is utilized to generate the beam of light. The beam of light leaves the sensing zone area and is incident on a light detection device (such as a photo cell) connected to an amplifier circuit. The light detection device monitors the light intensity and is arranged and configured to detect changes in the light intensity.

When a flying insect enters into the sensing zone, a part of the light forming the sensing zone is "blocked out" or extinguished. When light is extinguished from a beam path, a portion of the light is generally scattered and another portion of the light is absorbed by the object (in this instance a flying insect) in the beam path. Because the light incident on the detector loses these two components (e.g., the scattered and absorbed light), the intensity of the light incident on the detector is lowered. The light detection device detects the lower light intensity and generates a flying pest detection signal. Means are provided to electronically convert the flying pest detection signal to a flying insect count. Means may also optionally be provided to associate each flying pest detection signal with other monitored data. For example, the time and date when the count occurred, the temperature, and the ambient light, among other parameters may be stored with the flying insect count(s). The stored data may be transmitted in real time, transmitted periodically, and/or collected with a PDA device or the like.

Another feature of the present invention is the provision of an optional sensitivity adjustment means to compensate for the various devices into which the amplified signal from the light detection device might be provided. For example, a microprocessor, a transmitter, a manual input device and/or a counter block may be used together with the monitor.

Yet another feature of the present invention is that it may be completely passive or it may provide an attractant for the flying insects—such as UV lamps. Further, the present invention can act as a counter alone (e.g., as a flying insect monitor without a physical trap) or it can operate together with a trap. In the latter case, the flying insect may become entangled on a glue or sticky board lying beneath the light curtain and/or become eliminated by an electrical discharge device.

Therefore, according to one aspect of the present invention, there is provided a flying insect counter apparatus, comprising: a plurality of opposing reflective surfaces, the reflective surfaces having a first end and a second end; a light generation device arranged and configured to generate a beam of light, wherein the beam of light is reflected back and forth between the reflective surfaces from the first ends to the second ends to form a sensing zone between the reflective surfaces, whereby when flying insects intersect the sensing zone the flying insects cause changes in the light intensity of the beam of light; and a light intensity detection device, the beam of light operatively incident on the light intensity detection device after leaving the sensing zone, wherein the light intensity detector device detects flying insects as corresponding changes in the intensity of the beam of light.

According to another aspect of the invention, there is provided, a flying insect counter apparatus, comprising: a light generation device arranged and configured to generate a sheet of light, the sheet of light forming a sensing zone, whereby when flying insects intersect the sensing zone the flying insects cause changes in the light intensity of the sheet of light; and a light intensity detection device, the sheet of light operatively incident on the light intensity detection device after leaving the sensing zone, wherein the light intensity detector device detects flying insects as corresponding changes in the intensity of the sheet of light.

According to yet another aspect of the invention, there is provided a non-destructive flying insect counter, comprising: a laser diode to provide a focused beam; at least two opposing longitudinal reflecting members, the reflecting members being oriented relative to one another to reflect the beam incrementally along the longitudinal length of the reflecting members; and a photo cell, the photo cell arranged and configured such that the photo cell is in the path of the beam, wherein the photo cell detects the intensity of the focused beam, and whereby when a flying insect intersects the beam, then the intensity of the beam decreases and the photo cell generates a flying insect presence signal.

Yet another aspect of the invention provides for a method of detecting the presence of one or more flying insects by detecting changes in light intensity when a flying insect intersects a sensing zone, comprising: generating a source of collimated light; reflecting the light back and forth along the length of and between two reflective surfaces to establish a sensing zone; measuring the intensity of the light after leaving the sensing zone; and generating a flying insect detection signal when the intensity of the light decreases.

Other aspects of the present invention in accordance with the preceding paragraph include storing the flying insect detection signal and/or combining the flying insect detection signal with a real time indication of the time and date associated with the occurrence of the flying insect detection signal.

According to another aspect of the present invention, there is provided a pest reporting system, comprising: a pest report database; a plurality of light extinction based flying insect counters, the counters being arranged and configured to determine if a flying insect is in the area monitored by the counter and to generate a pest signal, manual input sensors associated with the flying insect counters, the sensors being arranged and configured to accept additional manual input; and a communication device, operatively connected to the flying insect counters and the manual input sensors, for receiving the pest signal and for communicating to the pest report database that a pest signal occurred and the specific activity sensing pest device at which the pest signal occurred, and wherein the pest report database is updated.

While the invention will be described with respect to preferred embodiment configurations and with respect to particular devices used therein, it will be understood that the invention is not to be construed as limited in any manner by either such configuration or components described herein. Also, while the particular types of flying insects and traps are described herein, it will be understood that such particular flying insects and traps are not to be construed in a limiting manner. Instead, the principles of this invention extend to any environment in which pest detection is desired. Further, while the preferred embodiments of the invention will be generally described in relation to use of a curtain or sheet of light, it will be understood that the scope of the invention is not to be so limited. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views:

FIG. 3a schematically illustrates a functional block diagram of a fly counter with an optional trapping function constructed in accordance with the principles of the present invention.

FIG. 3b schematically illustrates a functional diagram of an exposed elevated side view of the fly counter of FIG. 3a.

FIG. 3c schematically illustrates a functional diagram of an exposed elevated end view of the fly counter of FIG. 3a.

FIG. 4 schematically illustrates a functional block diagram of a destructive electrocution insect light trap constructed in accordance with the principles of the present invention.

DETAILED DESCRIPTION

Figure 1:
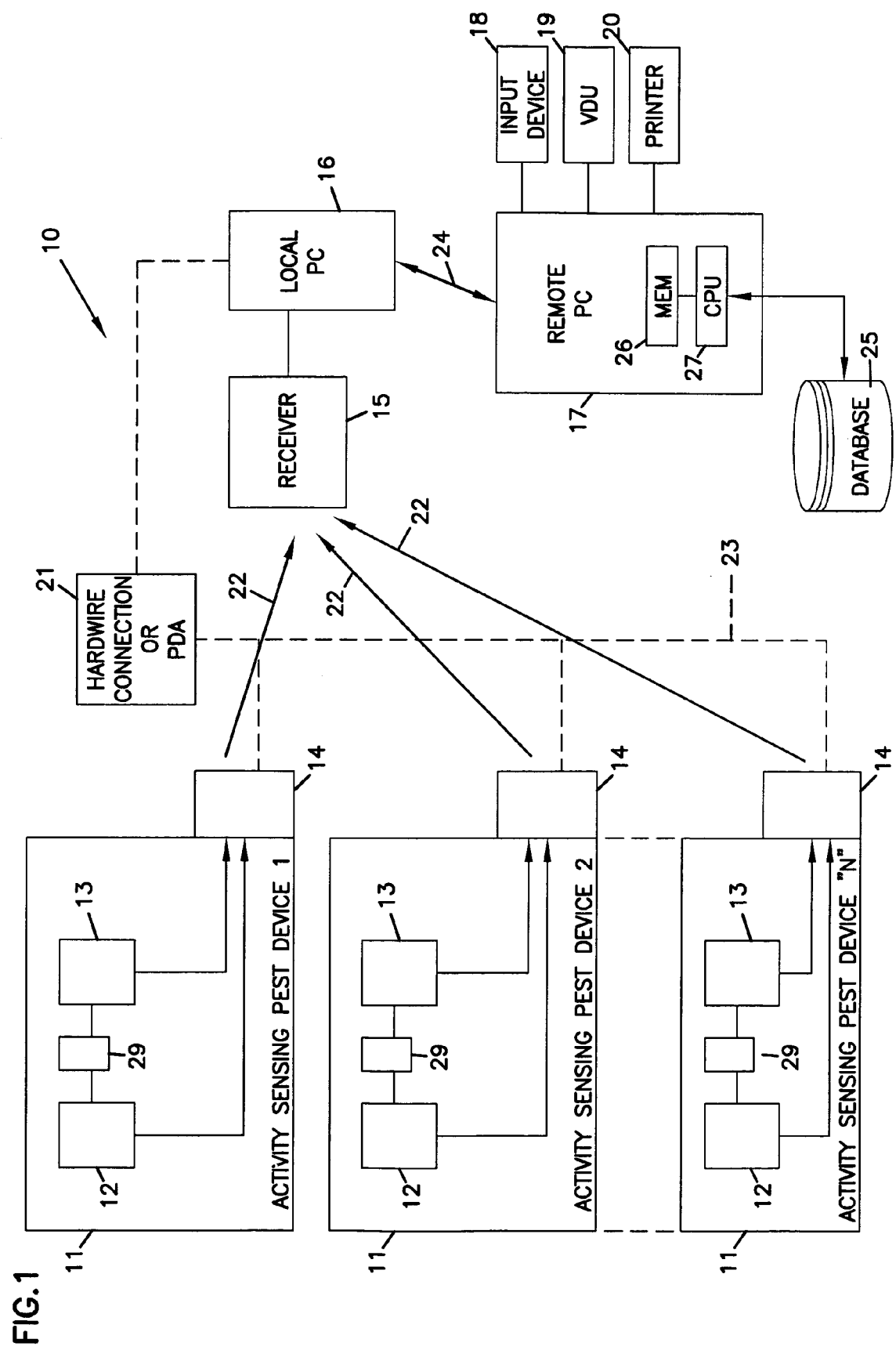
FIG. 1 is a functional block diagram of an automatic pest control report generation with additional trap parameter data system.

The principles of the present invention apply particularly well to its application to a flying insect detector. Although described herein in connection with flying insects, the invention is not so limited.

The detector 500 (best seen in FIGS. 3a–3c) will be described in more detail below pending a discussion of the environment in which the present invention may be employed. However, a brief discussion of the principles of the present invention will first be presented.

Generally the present invention utilizes light extinction to detect flying insects that intersect a sensing zone. On either side of the sensing zone are first and second opposing reflecting surfaces—each of the reflecting surfaces includes a first and a second end. The sensing zone is therefore generally defined as that physical area located between the two opposing reflective surfaces and two imaginary surfaces. The first imaginary surface connects the first ends of the reflective surfaces and the second imaginary surface connects the second ends of the reflective surfaces. It will be appreciated, however, that the sensing zone may be limited to that area which is actually covered by the reflected beam as next described.

A beam of light enters the sensing zone proximate the first end of the second reflecting surface and strikes the first reflecting surface at a predetermined angle from the normal to the first reflecting surface. The beam then reflects back and forth between the two opposing reflective surfaces a predetermined number of times. As the beam propagates back and forth between the two reflecting surfaces it steps along the opposing reflective surfaces from the first ends to the second ends. In this manner the beam travels down the longitudinal length of the two reflective surfaces. The beam leaves the sensing zone proximate the second end of the second reflective surface. It will be appreciated to those of skill in the art upon review of the present disclosure, however, that the beam may enter and leave the sensing zone from either end and/or proximate (or in the area of) either reflecting surface without affecting the principles of operation of the present invention.

Preferably, the reflective surfaces are arranged and configured to keep the beam from diverging out of the sensing zone. By maintaining a tight beam shape, the intensity of the beam is maintained at the light intensity detector means until interrupted by a flying insect intersecting the sensing zone. When that occurs, light is extinguished from the beam path and the light intensity detector means senses the change in beam intensity.

As noted above, the present invention may be employed as a stand alone detector or as a combined detector and trap. Further, the present invention can be used by itself or can be utilized in a larger detection and trapping environment. Accordingly, a detailed discussion of the flying insect detector method and apparatus will now be deferred pending a discussion of an automatic pest trap report generation and additional trap parameter data logging environment in which the present invention may be employed.

Automatic Pest Trap Report Generation and Additional Trap Parameter Data Logging Environment First referring to FIG. 1, a functional block diagram of the automatic pest report generation system and additional pest trap and pest monitor parameter data is provided. The system is shown generally by the designation 10. A plurality of activity sensing pest devices are shown at the designation 11. Any number of "n" activity sensing pest devices 11 may be utilized in connection with the present invention. The automatic pest trap report generation and additional trap parameter data logging environment system may include a variety of styles of activity sensing pest detectors. In the case of traps, each of the n traps 11 include a pest enclosing, retaining or killing device (best seen in FIG. 4 and discussed further below). As discussed above, one or more of the activity sensing pest devices 11 can also take the form of a passive or active pest monitor—which monitor may or may not include a trapping device. A pest sensor 12, a physical inspection data entry device 13, and a communication block 14 are also provided.

Pest sensor 12 may take a number of forms, but in each form generally monitors pest activity in and/or about the trap 11. Examples of the pest sensor 12 include a switch or mercury switch (for monitoring movement of the trap), a capacitance device (for monitoring a pest altering the capacitance of a grid), a current monitoring device (for detecting current spikes in a destructive or electrocution style trap), or light extinction of a light source (for monitoring an interrupted beam or laser). The sensor 12 is generally located in or on the pest trap 11. However, it is possible to also locate the pest sensor 12 adjacent or proximate the trap 11. It will be appreciated that sensor 12 may be located in an area without a trap being present. In this latter case, the sensor 12 acts as a pest monitor for that area. When pest activity is detected and a pest presence or detection signal is generated by the sensor 12, the pest presence signal is provided to the communication block 14.

The communication block 14 may take a number of forms. For example, the communication block may communicate over a fixed wire (e.g., to hardwire receiver 21 via optional connection 23) or by telephone or cellular phone, it may take advantage of putting signals over existing wiring in a building, or it may utilize over-the-air transmissions designated as 22. In each of these forms, the communication block 14 operates to pass the pest presence or detection signal—as a pest event—to a receiver 15 (or alternatively directly to local PC 16). In one embodiment, an RF type communication device is utilized. In this type of embodiment, the receiver 15 will generally be located relatively close to the transmitter device in communication block 14. However, the range is affected by, among other factors, the type of RF device used and by the structural characteristics of the facility or area. If appropriate communication schemes are utilized, then the receiver 15 may be located off-site. In a second preferred embodiment, a PDA device 21 is utilized to gather the data. In this case, either a cradle (not shown), an IR based connection, or other communication path (shown generally as optional connection 23) may be used.

Sensor 12 may include a memory device or other data storage to accumulate event data and then pass along a block of information to the communication device. For example, sensor 12 may be constructed to archive pest presence signals in an onboard memory location or in a separate memory device 29. The later communication of the stored data may occur at set intervals, may be prompted by a polling transaction, or may be physically activated by an inspector via a personal computer, special purpose computing device, or PDA 21. By storing the data, any number of pest detection events may be transmitted as a block.

For example, in one embodiment (best seen in FIG. 3a and discussed in more detail below) the sensor may archive event data in the counter block 511. The counter block 511 can include an electronic memory storage location, and can optionally include a visually perceptible means for displaying the data such as an LCD display or mechanical counter (not shown). The microprocessor block 509 can initiate transmission of the collected data via communications block 510. This can take the form of a PDA 21 establishing contact with the communications block 510 or take another of the forms identified above. The data can be passed as individual event data or as histograms of the number of events within different time windows.

The sensor 12 provides data on the activity sensing pest devices 11 identifier code, the time of the event, and the event itself. However, the PDA 21, the receiver 15 or local computer 16 (discussed below) may provide a date stamp for the received pest event. Unless the context provides otherwise, for convenience it will be assumed that the methodology utilized to transmit the data from the sensor is an RF system. Those skilled in the art, however, will appreciate that other methodologies described herein and equivalents may be employed to implement such communication.

Once the event is transmitted to receiver 15, the data is provided to local computer 16. Computer 16 may be a special purpose computing device or may be a personal computer (e.g., an IBM compatible computer having a Pentium style chip). The data is in turn provided to remote personal computer 17 over the internet or direct connection 24. Computer 17 includes a processor 27, input devices 18 (e.g., keyboard and mouse or other pointing device), video display unit 19, and a printer 20. CPU 27 is provided to run a database program stored in memory 26. The program may also be running from a hard drive, floppy drive, CD-ROM, or from a server or other computer on a network machine. The database 25 is stored in memory 26. It will be appreciated that the database may also be stored on a local area network server, hard drive, cd-rom drive or other storage device accessible by the CPU 27.

Database 25 stores the event data and includes other database functions, such as relating events to pest trap identification numbers, and generating reports, among others. A number of commercially available relational database programs may be used capable of storing and relating fields in a number of records. A report writing capability is also desirable. The received data from the various activity sensing pest devices 11 must be recognized by the computer 17 and stored in the database 25. The database 25 can reside on local computer 16 with reports being generated locally and, optionally, transmitted to other computers via a network, extranet or internet.

In the database 25, the activity associated with each activity sensing pest devices 11 may be tracked by the unique ID number. The facility of interest contains any desired number of activity sensing pest devices 11 and the location of the activity sensing pest devices 11 are maintained with the unique ID number to be used in the reporting process. Desirable reports include trap activity data for a specific trap, the activity of traps which have initiated pest presence signals (and other traps which should be visited according to some determined schedule), a summary report with additional trap parameter data added following a physical inspection of the trap(s) and a summary report for each of the traps.

In order to provide the feedback information, each activity sensing pest device 11 also preferably includes one or more feedback devices 13 which permit an inspector to provide physical trap and monitor parameter feedback at the actual location of the activity sensing pest devices 11. This additional data is preferably input to the database 25 running on computer 17 (via the communication block 14 to receiver 15 to local computer 16). The feedback device 13 may take the form of one or more buttons; a keypad; a keyboard; one or more dipswitches; an infrared receiver which is configured to interact with a PDA 21 (e.g., of the type sold under the designation Palm Pilot or other personal data device), or any other input device allowing selection among a plurality of parameter ID's such as those set forth in Table I below. In the discussion of various embodiments, the feedback device 13 is also referred to herein as physical inspection data entry device 13 and additional trap parameter input means 13. In each case, the device 13 allows an inspector to indicate a particular parameter, from among a predetermined set of parameters. For example, an inspector could indicate that a trap was inspected and no animal was found or that the trap was inspected and an animal was found. Table I includes a representative list of codes which may be utilized by a trap inspector.

TABLE I

| Parameter ID | Parameter Description |
|---|---|
| 1 | Trap Checked - No Activity |
| 2 | Trap Checked - Activity Type 1 Found |
| 3 | Trap Checked - Activity Type 2 Found |
| 4 | Trap Checked - Activity Type 3 Found |
| 5 | Trap Cleaned |
| 6 | Trap Out of Place |
| 7 | Trap Damaged |
| 8 | Light Bulb Replaced |
| 9 | Glueboard Replaced |
| 10 | Cover Opened |

It will be appreciated that the trap parameter/data is exemplary and other information may be provided. Further, the Parameter ID number is assigned arbitrarily above. In other systems, the parameter ID number may be associated with other trap parameters.

The feedback data can alternatively be entered directly into local computer 16 by an operator after physically inspecting the traps. The data might also be temporarily stored during the inspection in a PDA 21 or other special computing device, and subsequently downloaded into computer 16. In these embodiments, it will be appreciated that the input block 13, communication block 14 and receiver block 15 may be modified to function properly with the data gathering methodology employed. However, transmission of initial data on pest activity is preferred in order to generate an initial report (for example visits to the appropriate activity sensing pest devices can then be determined).

Preferably each activity sensing pest device 11 includes a feedback mechanism 13. Due to the characteristics of the physical premises, the costs, the benefits from the individual activity sensing pest device 11, and other factors, one or more of the activity sensing pest devices 11 may not include a feedback sensor 13. However, in view of the advantages provided by the feedback reporting system as described herein, it will be appreciated that the benefits increase as the amount and quality of the feedback data increases.

Figure 2:
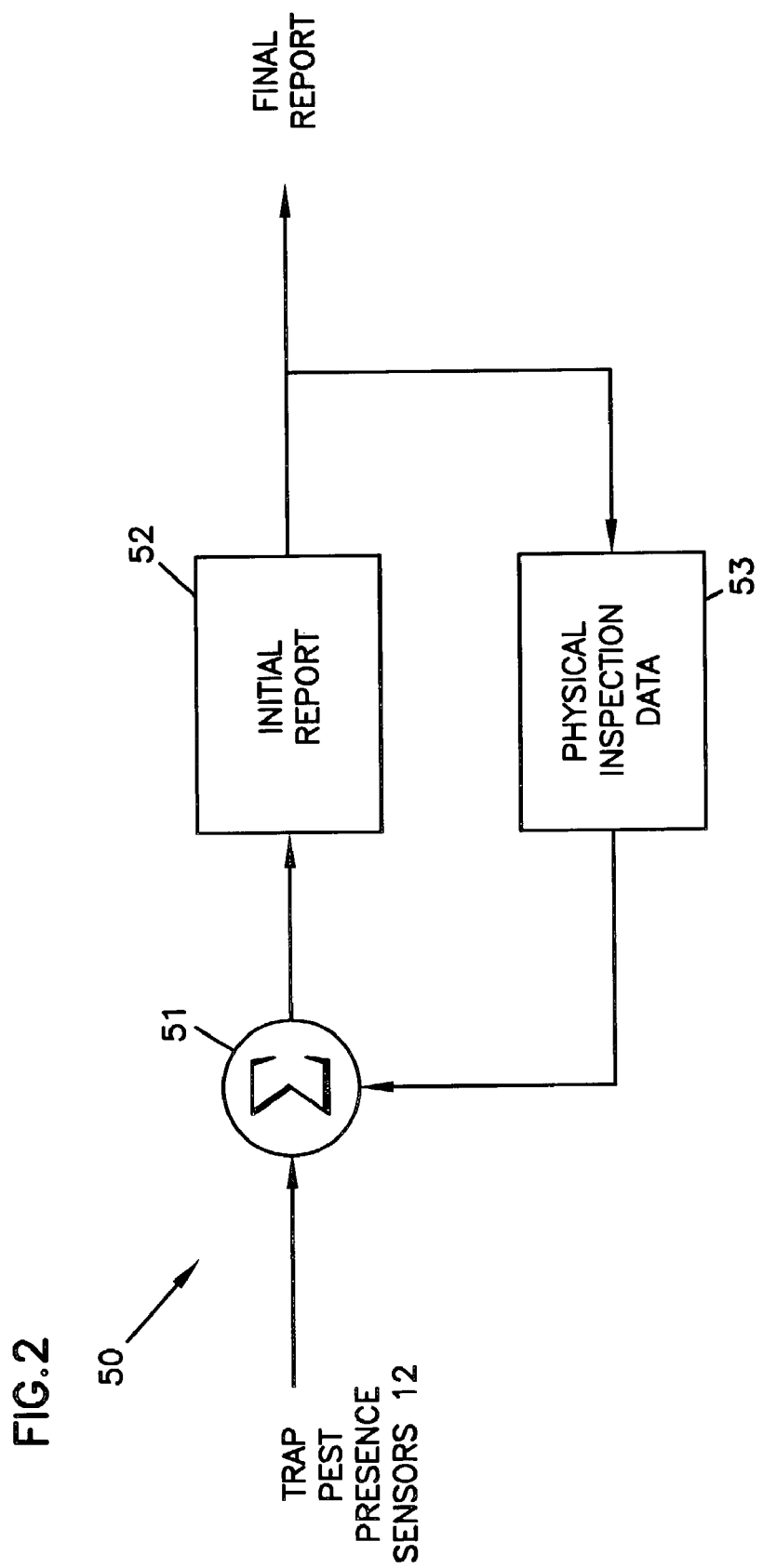
FIG. 2 is a schematic diagram of the report generation process of the system of FIG. 1.

Once transmitted to the database 25, the additional parameter data on the activity sensing pest devices is also tracked against the appropriate ID number. This results in a refining of both the data and the resulting reports from database 25. The activity sensing pest devices reporting becomes a feedback loop as illustrated in FIG. 2 by the designation 50. In FIG. 2 the sensors 12 provide data to summing block 51 and to initial report block 52. The physical inspection component of the process includes reviewing the initial report(s) 52 and providing additional physical inspection data at block 53. The physical inspection data can include data on each trap and monitor 11. However, preferably the data is for a smaller set of traps and monitors, which include those traps and monitors that generated a pest activity event signal and a number or percentage of the remaining traps and monitors of the "n" activity sensing pest devices 11 in the facility that did not show any pest activity.

The feedback loop provides data on false positives, disturbed traps, and other factors. The time data corresponding to when the pest activity occurs helps to proactively determine pest infiltration factors and/or information relating to maintaining an optimum pest control plan, such as disturbed traps, etc.

The various styles of traps 11 may include a large variety of commercially available traps for trapping any type of animal, such as rodents or insects. Examples of commercially available live animal/rodent traps are the Victor M310 Tin Cat; the Havahart Live Traps; the Kwik Katch Mouse Trap, and the Kness Ketch-All. Examples of commercially available zapping light traps are the Gardner AG2001; the Gardner AG-661 Light Trap, and the Anderson Adhesive Insect Light Trap. Examples of commercially available glueboard light traps are the Ecolab Stealth Unit; the Gardner WS25; the Gardner GT100, and the Anderson Adhesive Insect Light Traps.

Non-Destructive Flying Insect Counter

Figure 3C:
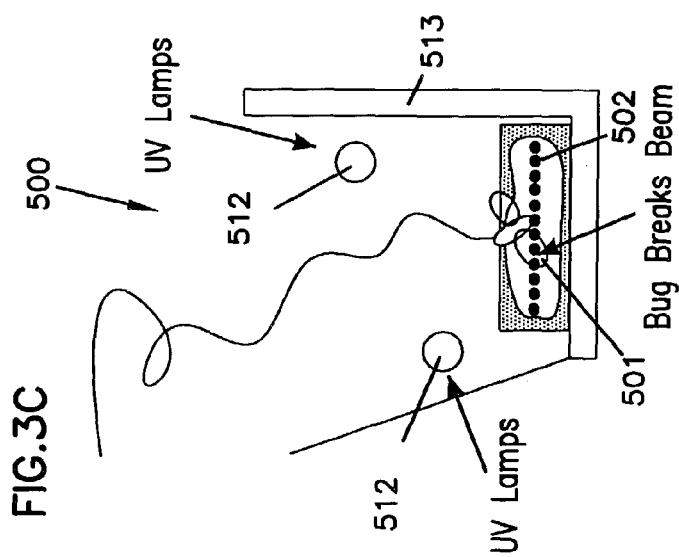
Figure 3B:
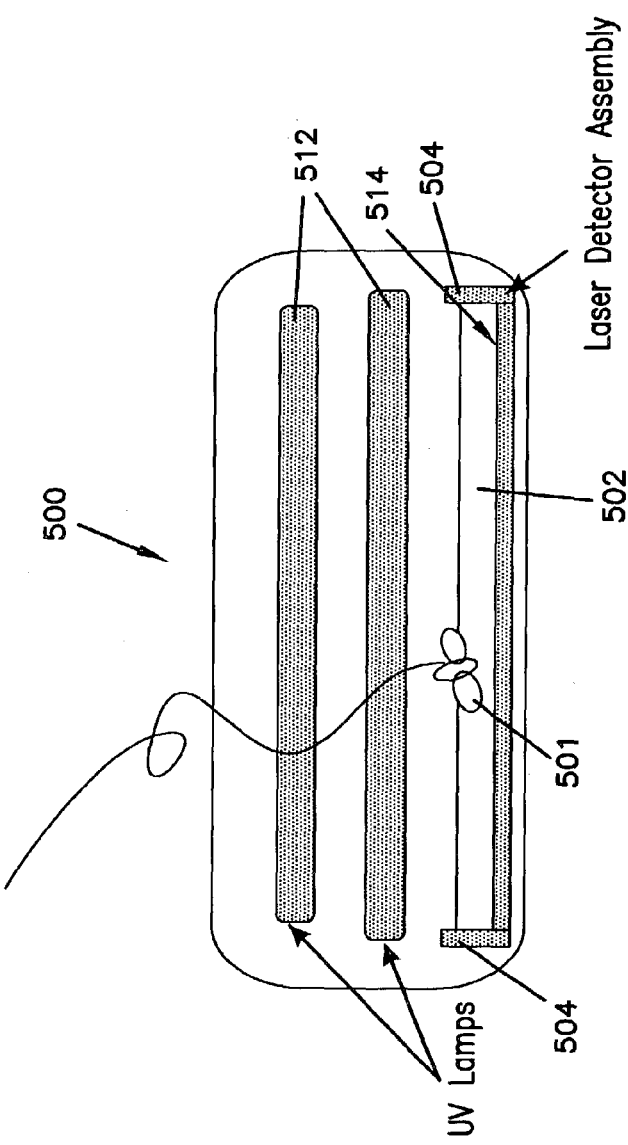

FIGS. 3a through 3c illustrate a non-destructive flying insect counter or detector, while FIG. 4 illustrates a destructive flying insect trap which may be employed in connection with the non-destructive insect counter. The counter 500 includes a curtain of light made up of a beam 502 which is bounced between reflective surfaces 504. Alternatively, the curtain (or sheet) of light may be generated by a lens, one or more focusing devices, and/or other light generating source(s). Such curtain may not be required to be completely continuous (e.g., gaps in the continuity of the sheet may exist within the sensing zone). However, any gaps will preferably be designed to be of a size and shape wherein pests moving through the sensing zone do not avoid detection.

In the preferred embodiment, a laser 503 (such as a class III-A laser diode) is utilized with a laser power supply 505. The power supply 505 is preferably a plurality of N-cell 1.5 volt batteries. Other power sources and types of lasers (and/or collimated light) can be used. Other light sources with collimating lenses (not shown) might also be used. The laser beam terminates at the light detection means, preferably a photo cell 506. However, other devices which function to detect changes in light intensity might also be used. The photocell 506 is connected to amplifier circuit block 507. A sensitivity adjustment block 508 is included to compensate for the various devices into which the amplified signal from the photo cell might be provided. In the preferred embodiment, a read relay coil switch is used. The other various devices can include a microprocessor 509, a transmitter 510 (which may be used as a transmitter 14), manual input device (feedback mechanism) 516, and/or a counter block 511. Manual input device 516 may be used as the additional trap parameter input means 13.

When a flying insect 501 enters into the beam of light 502, a part of the light is extinguished. The photocell 506 detects the lower light intensity. Therefore, the light curtain may be used as a pest monitor or sensor 12. The amplifier circuit block 507 and sensitivity adjustment block 508 provide the pest activity signal to transmitter block 510 (and/or other blocks 509 and 511). The flying insects 501 are attracted by UV lamps 512 or other attractant. The device can operate as a counter alone (e.g., as a pest monitor without a physical trap) or it can operate as a trap. In the latter case, the flying insect may become entangled on a glue or sticky board 514 lying beneath the light curtain and/or become eliminated by electrical discharge device (not shown). A housing 513 mounts the various components of the trap.

By non-destructive what is meant is that the object and/or function of the trap is restraining, detaining or trapping. Destructive traps generally include a killing function whereby the pest is disfigured, dismembered, electrocuted and/or otherwise undergoes an extreme physical change.

FIG. 4 illustrates an electrical-discharge insect-control system 550 with an event monitoring circuit 551. The trap 550 kills insects by discharging electricity from a transformer 552 through the insect when it approaches the electrified grid 553. The insect reduces the air gap between the electrodes of the grid, allowing breakdown to occur in the air and electrical current to flow through the insect and air. The current flows during the short period of time in which the insect is in the vicinity of the grid and kills the insect. The trap 550 includes a sensing circuit 551 to monitor for a pest event (e.g., when an insect is in the vicinity of the grid 553). When the current flows, the circuit detects the transient signal as the system is activated and supplies this signal to a counter 554 and/or microprocessor 555 for compilation of event data. This data can then be transmitted by a transmitter device 556 for further analysis. Feedback information may also be supplied for transmission via the feedback device 557 by the user of the system.

It will be appreciated that the principles of this invention apply not only to detecting flying insects, but also to the method of detecting the insects, as well as collecting pest monitoring and/or trap data. While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefor other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A flying insect counter apparatus, comprising:
   a) a plurality of opposing reflective surfaces, the reflective surfaces having a first end and a second end;
   b) a light generation device arranged and configured to generate a beam of light, wherein the beam of light is reflected back and forth between the reflective surfaces from the first ends to the second ends to form a sensing zone between the reflective surfaces, whereby when flying insects intersect the sensing zone the flying insects cause changes in the light intensity of the beam of light; and
   c) a light intensity detection device, the beam of light operatively incident on the light intensity detection device after leaving the sensing zone, wherein the light intensity detection device detects flying insects as corresponding changes in the intensity of the beam of light.

2. The apparatus of claim 1, wherein the light intensity detection device generates a flying insect presence signal when the beam of light incident on the light intensity detection device changes.

3. The apparatus of claim 2, wherein the light intensity detection device generates a flying insect presence signal only when the beam of light incident on the light intensity detection device decreases.

4. The apparatus of claim 1, further comprising a data logger device arranged and configured to accept and store insect presence signals.

5. The apparatus of claim 4, wherein the data logger device is arranged and configured to keep time and to provide real time clock signals and associate the signals with the insect presence signals, whereby the time the insect crosses the path is preserved and the information is stored in close proximity to when the event occurred.

6. The apparatus of claim 5, further comprising sensors arranged and configured to accept additional manual input.

7. The apparatus of claim 6, wherein the manual input includes data on the condition of the apparatus when it is inspected.

8. The apparatus of claim 1, further comprising a trapping element.

9. The apparatus of claim 8, wherein the trapping element is a glue board.

10. The apparatus of claim 9, wherein the attractant is a U.V. light.

11. The apparatus of claim 8, wherein the trapping element is an electrocution grid.

12. The apparatus of claim 1, further comprising an attractant.

13. The apparatus of claim 1, further comprising an attractant and a trapping element.

14. The apparatus of claim 13, wherein the trapping element is a glue board and the attractant is a (U.V. light.

15. A flying insect counter apparatus, comprising:
   a) a light generation device arranged and configured to generate a sheet of light, the sheet of light forming a sensing zone, whereby when flying insects intersect the sensing zone the flying insects cause changes in the light intensity of the sheet of light; and
   b) a light intensity detection device, the sheet of light operatively incident on the light intensity detection device after leaving the sensing zone, wherein the light intensity detection device detects flying insects as corresponding changes in the intensity of the sheet of light.

16. The apparatus of claim 15, wherein the light intensity detection device generates a flying insect presence signal when the sheet of light incident on the light intensity detection device changes.

17. The apparatus of claim 16, wherein the light intensity detection device generates a flying insect presence signal only when the sheet of light incident on the light intensity detection device decreases.

18. The apparatus of claim 15, further comprising a data logger device arranged and configured to accept and store insect presence signals.

19. The apparatus of claim 18, wherein the data logger device is arranged and configured to keep time and to provide real time clock signals and associate the signals with the insect presence signals, whereby the time the insect crosses the path is preserved and the information is stored in close proximity to when the event occurred.

20. The apparatus of claim 19, further comprising sensors arranged and configured to accept additional manual input.

21. The apparatus of claim 20, wherein the manual input includes data on the condition of the apparatus when it is inspected.

22. The apparatus of claim 15 further comprising a trapping element.

23. The apparatus of claim 22, wherein the rapping element is a glue board.

24. The apparatus of claim 22, wherein the trapping element is an electrocution grid.

25. The apparatus of claim 15, further comprising an attractant.

26. The apparatus of claim 25, wherein the attractant is a U.V. light.

27. The apparatus of claim 15 further comprising an attractant and a trapping element.

28. The apparatus of claim 27, wherein the trapping element is a glue board and the attractant is a U.V. light.

29. A non-destructive flying insect counter, comprising:
   a) a laser diode to provide a focused beam;
   b) at least two opposing longitudinal reflecting members, the reflecting members being oriented relative to one another to reflect the beam incrementally along the longitudinal length of the reflecting members; and
   c) a photo cell, the photo cell arranged and configured such that the photo cell is in the path of the beam, wherein the photo cell detects the intensity of the focused beam, and whereby when a flying insect intersects the beam, then the intensity of the beam decreases and the photo cell generates a flying insect presence signal.

30. The counter of claim 29, further comprising event storing means, operatively connected to the photo cell, for storing the number of flying insect presence signals as events, the event storing means arranged and configured to store each event with an indication of the time and date at which the event occurred.

31. The counter of claim 30, further comprising a sensitivity adjustment means connected between the photo cell and the event storing means.

32. A method of detecting the presence of one or more flying insects by detecting changes in light intensity when a flying insect intersects a sensing zone, comprising:
   a) generating a source of collimated light;
   b) reflecting the light back and forth along the length of and between two reflective surfaces to establish a sensing zone;
   c) measuring the intensity of the light exiting the sensing zone; and
   d) generating a flying insect detection signal when the intensity of the light decreases.

33. The method of claim 32, further including the step of storing the flying insect detection signal.

34. The method of claim 33, further including the step of combining the flying insect detection signal with an indication of the time and date associated with the occurrence of the flying insect detection signal.

35. A pest reporting system, comprising:
   a) a pest report database;
   b) a plurality of light extinction based flying insect counters, the counters being arranged and configured to determine if a flying insect is in the area monitored by the counter and to generate a pest signal,
   c) manual input sensors associated with the flying insect counters, the sensors being arranged and configured to accept additional manual input; and
   d) a communication device, operatively connected to the flying insect counters and the manual input sensors, for receiving the pest signal and for communicating to the pest report database that a pest signal occurred and the specific flying insect counters at which the pest signal occurred, and wherein the pest report database is updated.

36. The pest reporting system of claim 35, wherein one or more of the flying insect counters include a trap element.

37. The pest reporting system of claim 35, wherein the flying insect counter includes a light beam and a sensor for detecting the intensity of the light beam, wherein when a flying insect flies through the beam, the light intensity decreases and the sensor detects the decreased light intensity as a pest event.

* * * * *

UNITED STATES PATENT AND TRADEMARK OFFICE
CERTIFICATE OF CORRECTION

PATENT NO. : 7,071,829 B2 Page 1 of 1
APPLICATION NO. : 10/401302
DATED : July 4, 2006
INVENTOR(S) : Gardner, Jr. et al.

It is certified that error appears in the above-identified patent and that said Letters Patent is hereby corrected as shown below:

Col. 12, line 1, claim 23: "wherein the rapping" should read --wherein the trapping--

Signed and Sealed this

First Day of May, 2007

JON W. DUDAS
*Director of the United States Patent and Trademark Office*